United States Patent [19]
Fox

[11] Patent Number: 5,148,739
[45] Date of Patent: Sep. 22, 1992

[54] TRASH HANDLING AND STORAGE SYSTEM

[75] Inventor: Anthony Fox, Bloomington, Minn.

[73] Assignee: Marcella M. Fox, Bloomington, Minn.

[21] Appl. No.: 662,202

[22] Filed: Feb. 27, 1991

Related U.S. Application Data

[63] Continuation-in-part of Ser. No. 477,331, Feb. 8, 1990, abandoned.

[51] Int. Cl.⁵ .................................... B30B 15/32
[52] U.S. Cl. ........................... 100/45; 62/341; 100/92; 100/99; 100/215; 100/218; 100/299 A; 232/43.2; 414/398
[58] Field of Search ............... 100/45, 92, 93 P, 99, 100/102, 215, 218, 229 A, 299; 62/341; 414/21, 398; 232/43.1, 14 43.5, 44; 220/908

[56] References Cited

U.S. PATENT DOCUMENTS

| | | | |
|---|---|---|---|
| 525,616 | 9/1894 | Ostermeyer | 232/43.2 X |
| 1,494,640 | 5/1924 | Storch et al. | 232/43.3 |
| 1,688,271 | 10/1928 | Finch | 232/43.3 X |
| 1,916,531 | 7/1933 | Robb | 414/398 X |
| 2,021,644 | 11/1935 | Cornelius et al. | 232/43.3 |
| 2,142,464 | 1/1939 | Vassalo | 232/43.3 X |
| 2,600,587 | 6/1952 | Spitz | 100/215 |
| 2,792,171 | 5/1957 | Rosset | 232/43.3 |
| 3,261,441 | 7/1966 | Mullens | 232/43.2 X |
| 3,279,685 | 10/1966 | Price | 232/43.2 |
| 3,298,533 | 1/1967 | Safford | 232/43.5 X |
| 3,514,969 | 6/1970 | Harza | 62/341 |
| 3,538,844 | 11/1970 | Howard | 100/218 X |
| 3,650,120 | 3/1972 | Harza | 62/341 X |
| 3,659,427 | 5/1972 | Harza | 100/229 A X |
| 3,691,943 | 9/1972 | Boyd | 100/215 |
| 3,748,820 | 7/1973 | Fox | 100/229 A X |
| 3,754,501 | 8/1973 | Horn | 232/43.1 X |
| 3,836,021 | 9/1974 | McWilliams | 414/398 |
| 4,044,569 | 8/1977 | Harza | 62/341 |
| 4,071,991 | 2/1978 | Hulligan | 232/43.2 X |
| 4,220,014 | 9/1980 | Connors | 62/341 X |
| 4,403,803 | 9/1983 | Szendrödi et al. | 414/398 X |
| 4,727,804 | 3/1988 | Tondo et al. | 100/215 |
| 4,987,988 | 1/1991 | Messina et al. | |
| 5,016,197 | 5/1991 | Neumann et al. | 100/99 X |

FOREIGN PATENT DOCUMENTS

| | | | |
|---|---|---|---|
| 0055236 | 6/1982 | European Pat. Off. | 100/92 |
| 2407482 | 8/1975 | Fed. Rep. of Germany | 232/43.2 |
| 52-42660 | 4/1977 | Japan | 100/229 A |
| 62-218312 | 9/1987 | Japan | 414/398 |
| 8105136 | 6/1983 | Netherlands | 100/92 |

*Primary Examiner*—Philip R. Coe
*Assistant Examiner*—Stephen F. Gerrity
*Attorney, Agent, or Firm*—Haugen and Nikolai

[57] ABSTRACT

A unique automated and comprehensive through-the-wall waste handling and storage system for treating organic and inorganic waste generated in a building of interest is disclosed in which waste to be discarded is loaded into a through-the-wall system from one side of a wall of the building of interest, stored in a container, and removed from the container on the other side of the wall of the building of interest. The container of the invention includes space conditioning refrigeration system and contemplates embodiments of an integrated waste handling and storage system which accommodate all types of waste and many levels of automation and which also eliminate many prior art sanitation and sorting problems associated with the handling and the storage of waste prior to disposal.

48 Claims, 13 Drawing Sheets

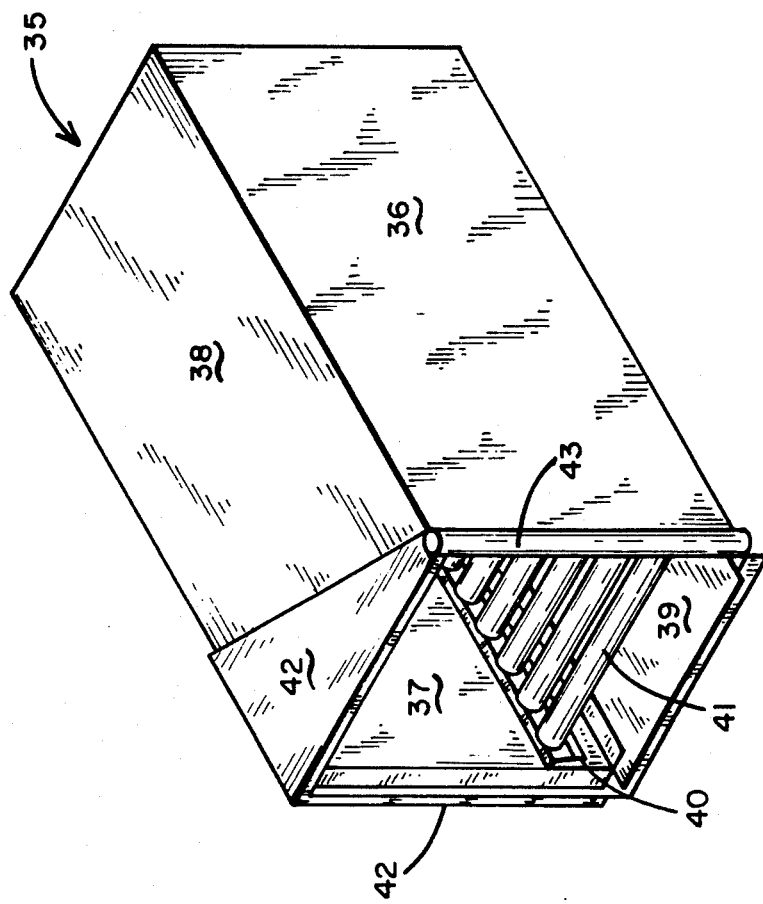
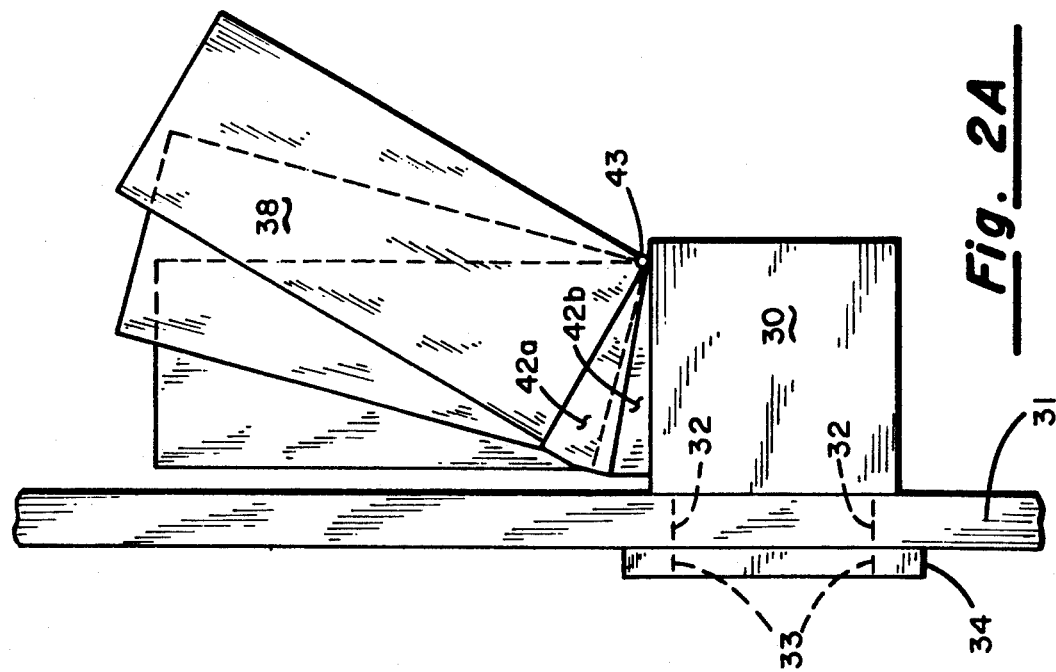
Fig. 2B
Fig. 2A

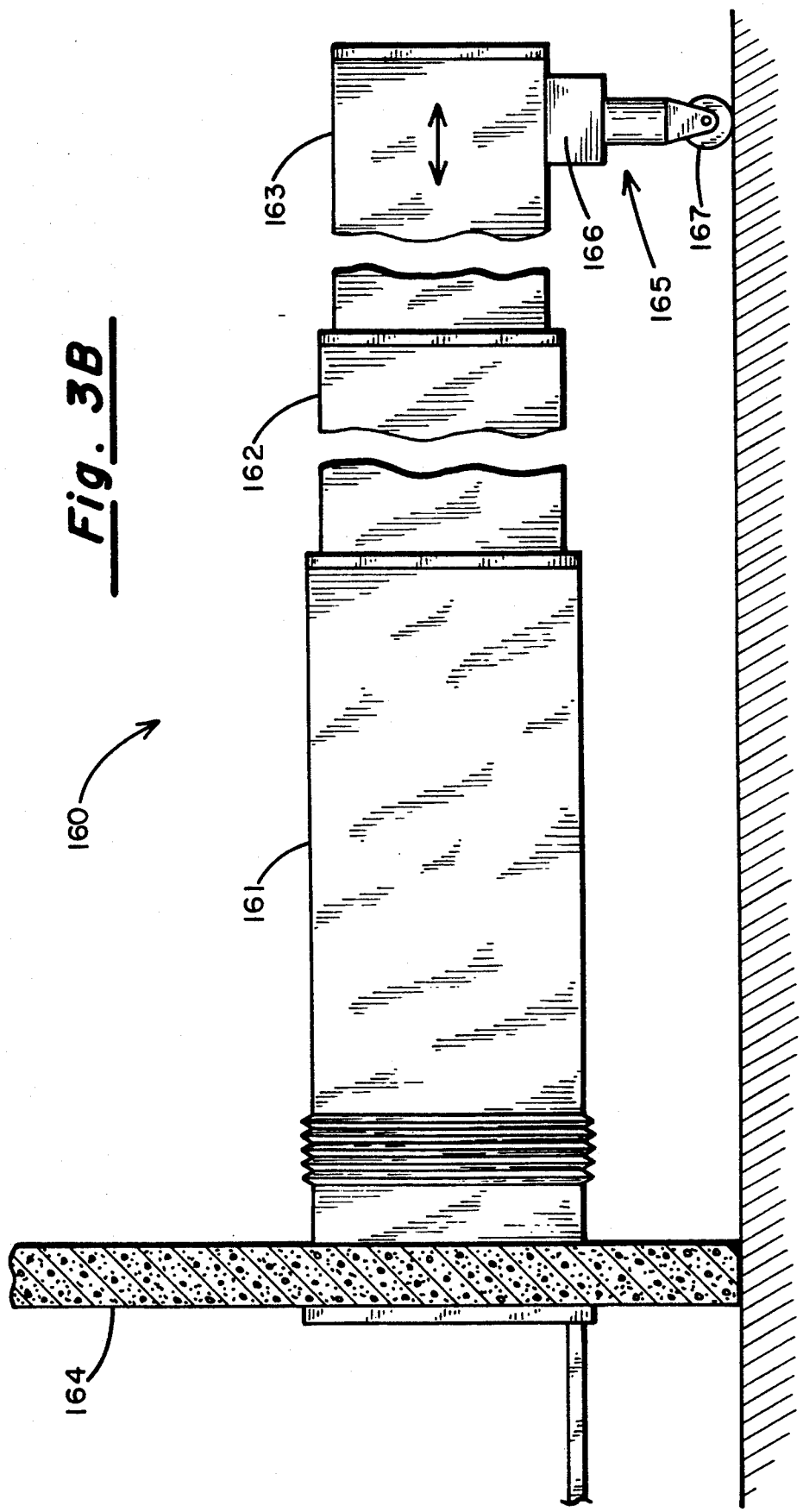

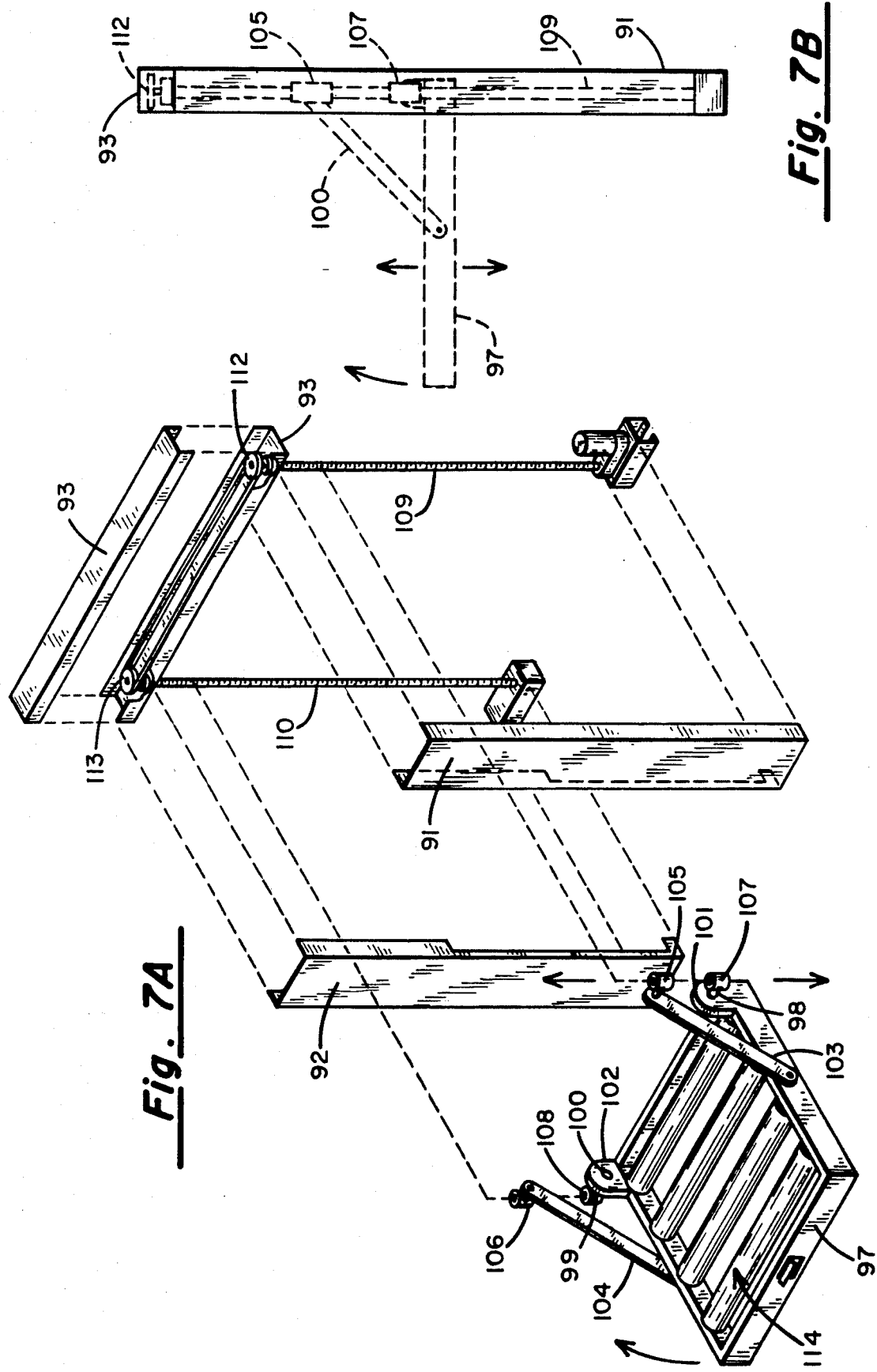

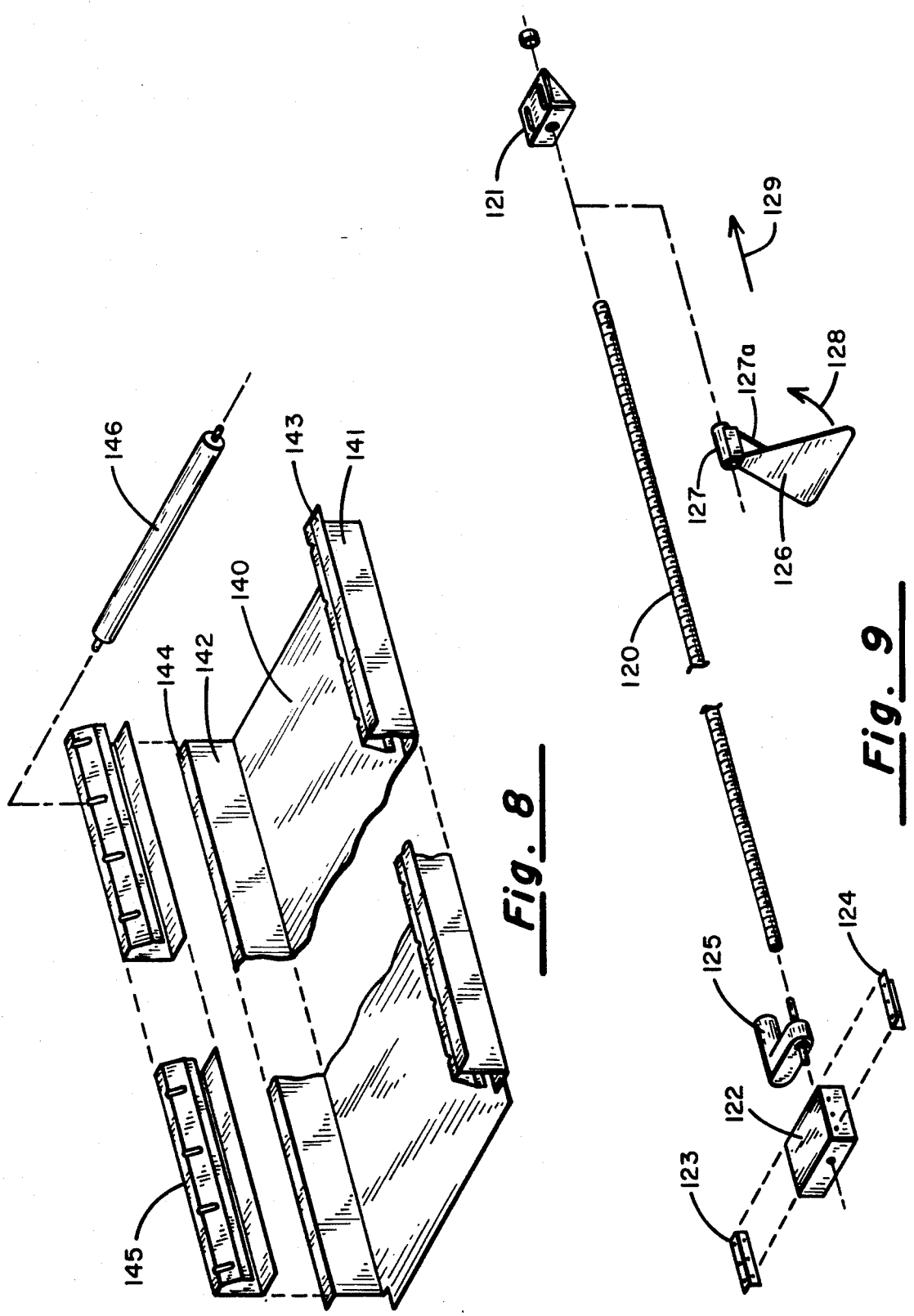

TRASH HANDLING AND STORAGE SYSTEM

BACKGROUND OF THE INVENTION

Cross-Reference to Related Applications

This application is a continuation-in-part of application Ser. No. 07/477,331, filed Feb. 8, 1990 (now abandoned).

FIELD OF THE INVENTION

This invention relates generally to the compacting, storage and removal of organic and inorganic waste for industrial or commercial enterprises and multi-unit residential buildings, and more particularly, to a automated comprehensive waste compacting, storage and handling system which includes a through-the-wall storage container directly accessible for loading from the inside and for disposal from the outside of a building.

DESCRIPTION OF THE RELATED ART

A wide variety of machines for the collection, compaction and storage of trash and refuse are available commercially and are disclosed in the literature. This includes many types and models of machines for compacting or baling trash along with various types of storage containers. These include the familiar steel dumpster located behind restaurants and other commercial buildings which have loosely fitting hinged lids and which are designed to be lifted by side ears and dumped periodically into compatibly designed hauling trucks. These systems require that compacted or uncompacted waste, including paper and other solid waste together with garbage, to be hauled, usually by hand, from the building to the holding container where it may reside for several days prior to being removed. While this procedure presents no particular problem with paper or other relatively benign or inert solid waste materials, it may lead to unsanitary conditions with respect to garbage or other organic refuse which spoils readily, breeding bacteria, causing odors and attracting stray animals, rodents, insects and other unwanted pests.

Available landfills for the disposal of garbage and solid wastes are rapidly being depleted and it is already apparent that within the foreseeable future the cost for disposing of garbage and solid waste materials will skyrocket; in some areas, landfills will be unavailable entirely Even at this writing it is known that some restaurants and other food handling establishments have been forced to close because they could not cope with rising waste costs. This means that soon compaction, sorting and recycling will no longer be novelties or voluntary conservation efforts but will be the required modes of operation.

Commercial establishments dealing with food or garbage types of refuse which readily breed unsanitary conditions will no longer be able to simply store such wastes in open or flip-top metal containers behind the service establishments. It is contemplated that soon storage facilities for such refuse will have to be segregated, sealed and even refrigerated to maintain sanitary conditions on the premises. In some jurisdictions, apparently, this may be the law.

In addition to the rapidly increasing costs for disposing of waste materials in landfills, or the like, charges to commercial establishments for such services are usually made based on the frequency of pick-up and the volume, i.e., number of cubic yards of material based on the capacity of the dumpster. In some cases, the full charge is made regardless of the actual amount of material in the dumpster. Haulers charging by volume of material transported have been traditionally opposed to the use of trash compactors simply because they reduce the total volume of materials hauled. More recently, however, there has been evidence of an increasing trend toward utilizing weight as the criteria for refuse collection rather than volume. In this vein, the use of compaction as a part of an overall refuse treatment process is rising rapidly as the reduced volume is no longer a drawback to generating revenues for the haulers.

In view of the increasing pressure on landfills and other means of trash and refuse disposal, and the demand for recycling and more sanitary treatment of garbage, a great need exists for the provision of a comprehensive garbage and refuse treatment system which addresses the handling, storage and disposal of material in a manner which accommodates recycling and provides a sanitary and environmentally acceptable alternative to those in existence today.

SUMMARY OF THE INVENTION

By means of the present invention, many problems associated with the processing, handling and storage of trash and garbage pending disposal, particularly from food service and other commercial establishments, are solved by an unique automated and comprehensive through-the-wall trash handling and storage system which is accessible for loading material to be discarded from within and to a hauler from without an associated building. The invention contemplates embodiments of an integrated trash handling and storage system which will accommodate all types of trash and many levels of automation and will eliminate many of the prior art problems associated with sorting and sanitation in the handling and the storage of trash prior to disposal.

The present invention provides an elongated enclosed holding container for receiving, storing and discharging trash which is attached to the user's building at or near one end and is provided with a discharge system at the other end designed to discharge the trash into a hauling truck. An opening in the building wall preferably substantially congruent with a side or end opening at or near the receiving end of the container allows the direct loading of the container from inside the building. The container may consist of a single unit or a series of modular sections disposed in end-to-end fashion or even telescoped to provide a variable holding volume. Each unit may be single or multi-level. The container is preferably made to be freely horizontally pivotal with respect to the building on a movable support so that it requires a minimum space next to the building wall and can be pivoted away from the wall for better access by the hauler. It is also preferably vertically pivotal to provide an adjustable discharge height to better accommodate a variety of hauling systems.

In a preferred embodiment the trash loading system includes a vertically pivoting trash receiving door mounted on a horizontal axis which opens outward to a horizontal disposition exposing the opening in the container on the other side of a wall. The door, when opened to a horizontal position, can accommodate trash such as parcels including bales, boxes, bags and cubes from a trash compactor atop its inner surface, which may carry a series of spaced rollers or other conveying system. The access door horizontal mounting axis is also preferably vertically adjustable such that trash may be loaded on the door at any desired level and loaded from the door to a support means inside the container at one or more different levels. The storage volume within the enclosed holding container includes one or more levels for supporting parcels of compacted trash, possibly separated by type, and such support may include a series of spaced powered or unpowered rollers or a powered or unpowered belt conveyor.

One embodiment of the invention is directed to a fully automated mechanized trash processing system in which the trash to be handled consists of bales or other parcels of compacted trash segregated as to content and loaded from inside a building through an opening into a storage container which preferably has the ability to index such trash on a multiplicity of levels. The storage container is then accessed by a waste hauling truck from outside the building in a manner which automates proper disposal of each type of waste involved.

The invention is further directed to the mechanization and automation of the various operations involved in implementing the basic through-the-wall idea. This includes the transfer of compacted bales, boxes, bags, bundles or cubes of trash to the loading platform, the mechanized automatic loading of the trash into the storage container including the indexing thereof, the support and transport or propulsion of the trash through the container from the entry to the discharge end and the discharging operation for the trash into the hauling truck including the indexing of the discharge of the various types of waste material. The automated control of the system also contemplates limited access both from within and without the building in the form of automatic encrypted access for both the loading and discharging of trash. The system encompasses automatic counting of or weighing of the bales by using the entry door as a scale or by other means, keeping a running total of the amount and, if necessary, the amount of each type of trash contained in the container, possibly by weight or by number of parcels loaded.

The system may provide an output with regard to the need for discharging trash or even automatically calling for the collection of one or more types of trash as through an RF signal transmitting system. Such a communication system may also respond to inquiries by haulers as to the loading status of the system. The information may be reported by printed receipt or other desired means to verify trash amount, date, time or other relevant data for invoice papers.

Preferably the storage containers are parallelepipeds in shape and of modular construction consisting of one or more modular sections which can be assembled according to the needs of the user. If the space occupied by the storage container is of concern, the plurality of modular sections may be constructed in a telescoping fashion such that capacity may be increased as required prior to discharge.

In addition, the container is preferably provided with a space conditioning means for maintaining a desired temperature within the container for storage of the trash to meet any garbage refrigeration or other legal requirements. The integrity of the container of the system can also be made as rigorous as required with respect to separation from the environment. This includes making the bottom section leak proof and providing a drain means, if necessary, in the bottom of the storage section to drain off any liquid which might leak from punctured bags or other refuse parcels. Wash down systems can be provided if desired. Containers can even be constructed with fire doors that can close to make the container airtight to extinguish any fires which might occur within the storage container due to unforseen problems.

The discharge end of the container also contemplates an accessible door means and, in the preferred embodiment, the pivotal end of the container is made adjustable with respect to its height so that the discharge may be made at any level from any of a multiplicity of container support levels.

IN THE DRAWINGS

FIGS. 2A and 2B illustrate a pivot compensating sealing system and modular container for a end entry configuration such as illustrated in FIG. 1A;

FIG. 3B shows a side elevational view partially in section of still another embodiment;

FIG. 7A is an exploded perspective view of an alternative embodiment of the door assembly for which FIG. 7B shows a side elevation detail;

FIG. 8 is an exploded perspective view illustrating a container bottom assembly in accordance with the invention;

FIG. 9 depicts a further exploded perspective view illustrating a retracting pusher mechanism for urging parcels of trash along in one direction within the container of the invention;

DESCRIPTION OF THE PREFERRED EMBODIMENT

Figure 1B:
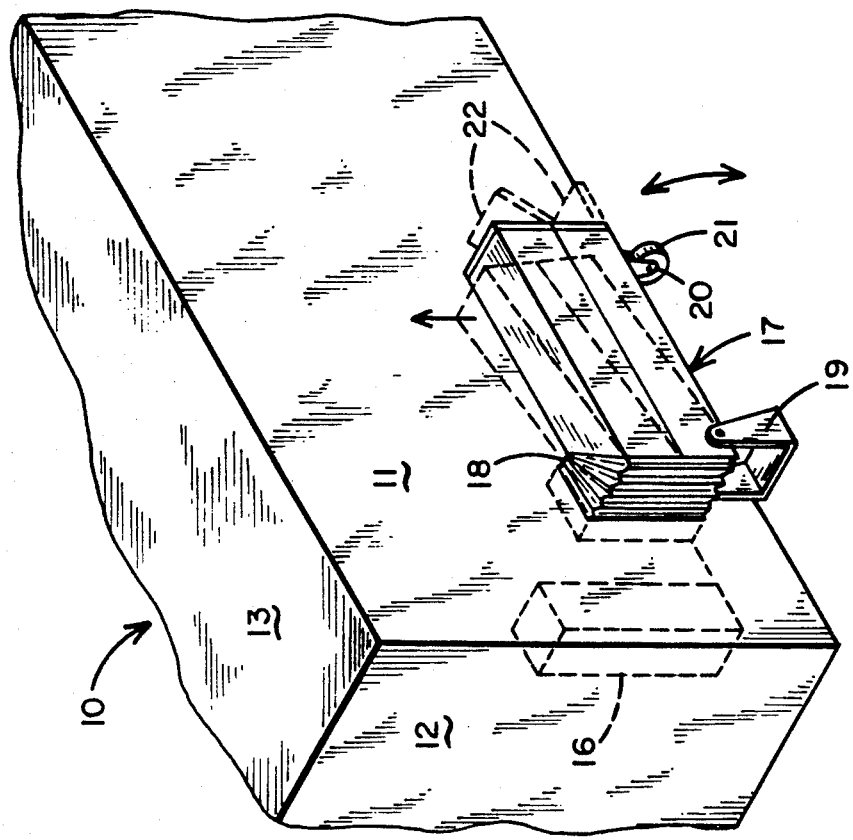
FIGS. 1A and 1B are perspective representations of alternate approaches to the trash handling and storage system of the invention with respect to addressing a building for through-the-wall disposal of trash.
Figure 1A:
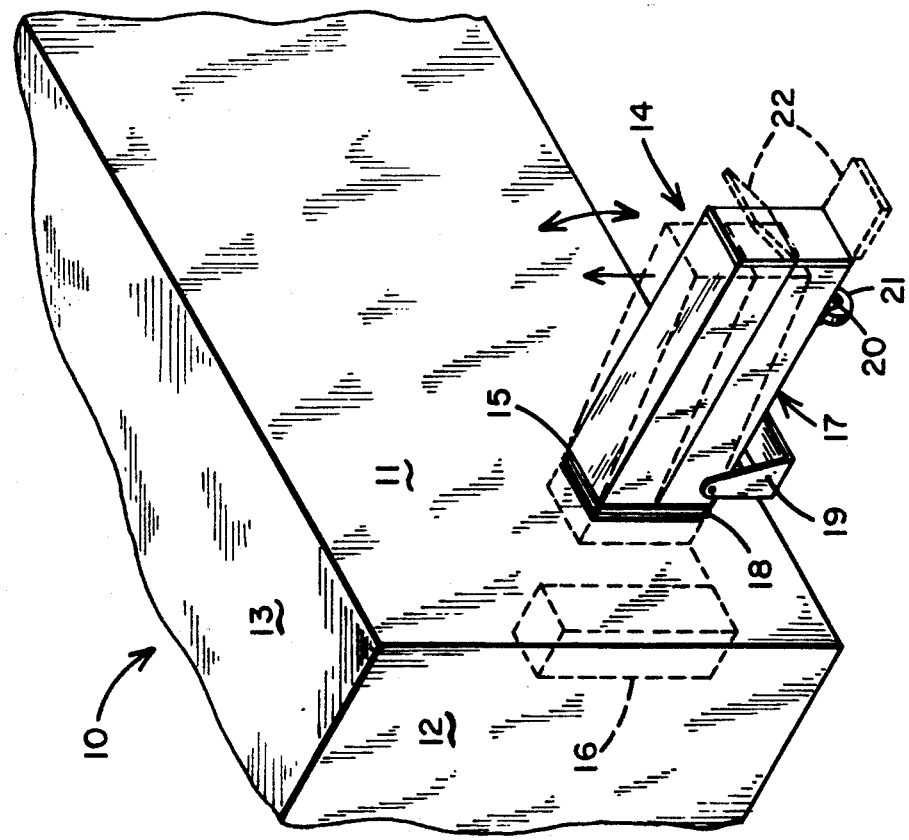

The invention will now be described with particular reference to the illustrative figures. FIGS. 1A and 1B are perspective representations of the general concept of the through-the-wall trash handling and storage system of and how it is preferably disposed with respect to the building it serves. A building corner fragment is shown generally at 10 and includes side and end walls 11 and 12 together with a roof fragment 13. The container for receiving, storing and discharging refuse is shown generally at 14 with an open end 15 fixed with respect to and addressing an opening (not shown) in the building wall 11 where it can address a trash compactor indicated by the dotted structure 16.

The container contemplates a substantially rectangular parallelepiped-shaped structure 17 which attaches to the wall 11 of the building using an adjustable seal such as the accordioned member 18 which enables the outward end of the container 17 to pivot from a position parallel to the wall to one perpendicular to the wall if required. The system can be connected to the wall 11 through an end or side mount and a transition chamber can be provided if desired.

The system generally further includes an inward support means as at 19, although the container 17 may also be supported directly from the wall 11, and an outer support 20 including a wheel as at 21 to allow for pivotally adjusting the container 17 with respect to the wall As illustrated by the dotted phantom representation together with the vertical arrows in FIGS. 1A and 1B the system is also designed to be vertically pivotal with respect to the wall 11 so that the height of the outbound end can be adjusted to accommodate any desired height for discharge to a corresponding hauling system. A pivotal discharge door 22 is also shown. Details of the stem are described in greater detail below.

FIG. 2 depicts one embodiment of an end-attached storage container system in which an initial trash receiving ante chamber 30 is fixed to a building wall 31 having an opening indicated by 32 which matches an inner door opening 33 in frame 34. The modular container is shown generally in perspective at 35 in FIG. 2B and is shown in schematic top-view form in FIG. 2A. The modular structure 35 includes a pair of side walls as at 36 and 37, a top panel 38 and bottom panel 39 which form a parallelepiped shape. The module includes a trash support roller conveyor, illustrated by roller support 40 together with rollers 41, which extends the full length of the modular section and may be one of several such conveyors mounted at different heights in the modular section 35. The top 38 and side 37 are provided with a series of overlapping bent triangular plates as at 42a and 42b (FIG. 2A) which overlap top member 38 and side member 37 but which fan out, as shown in FIG. 2A. As the container 35 is pivoted away from the wall 31 to maintain the sealed integrity of the system. Members as 42a and 42b pivot about a vertical pivotal axis illustrated at 43, as the container 35 itself rotates about the axis 43. The front end of the container including the front end of top member 42 remains fixed to the chamber 30 and the series of plates simply fan out to cover the top and side opening to maintain the integrity of the system.

FIG. 3 illustrates fragments of additional contemplated embodiments which may be used to accomplish the objectives of the invention. A building wall 50 is shown to which any of several types of containers, or containers having different support and conveying systems, as at 51 and 52 may be attached. Accordion system 53 operates in conjunction with a pivotal mounting 54 to allow the container 51 or 52 to pivot with respect to the building as enabled by carriage 55 with wheel 56 mounted thereto. The fragmentary views of the side mounted containers 51 and 52 are intended to be illustrative of alternative embodiments of similar modules.

The system connects the interior of the building through an opening in wall 50 substantially congruent with 53 to receive trash and to discharge trash accumulated over time in the storage volume into a hauler receptacle such as illustrated by the fragmental section of a refuse truck 57. Thus, door 58 opens to allow parcel 59 to move as from the conveyor 60 of trash container 52 to the truck.

Figure 3A:
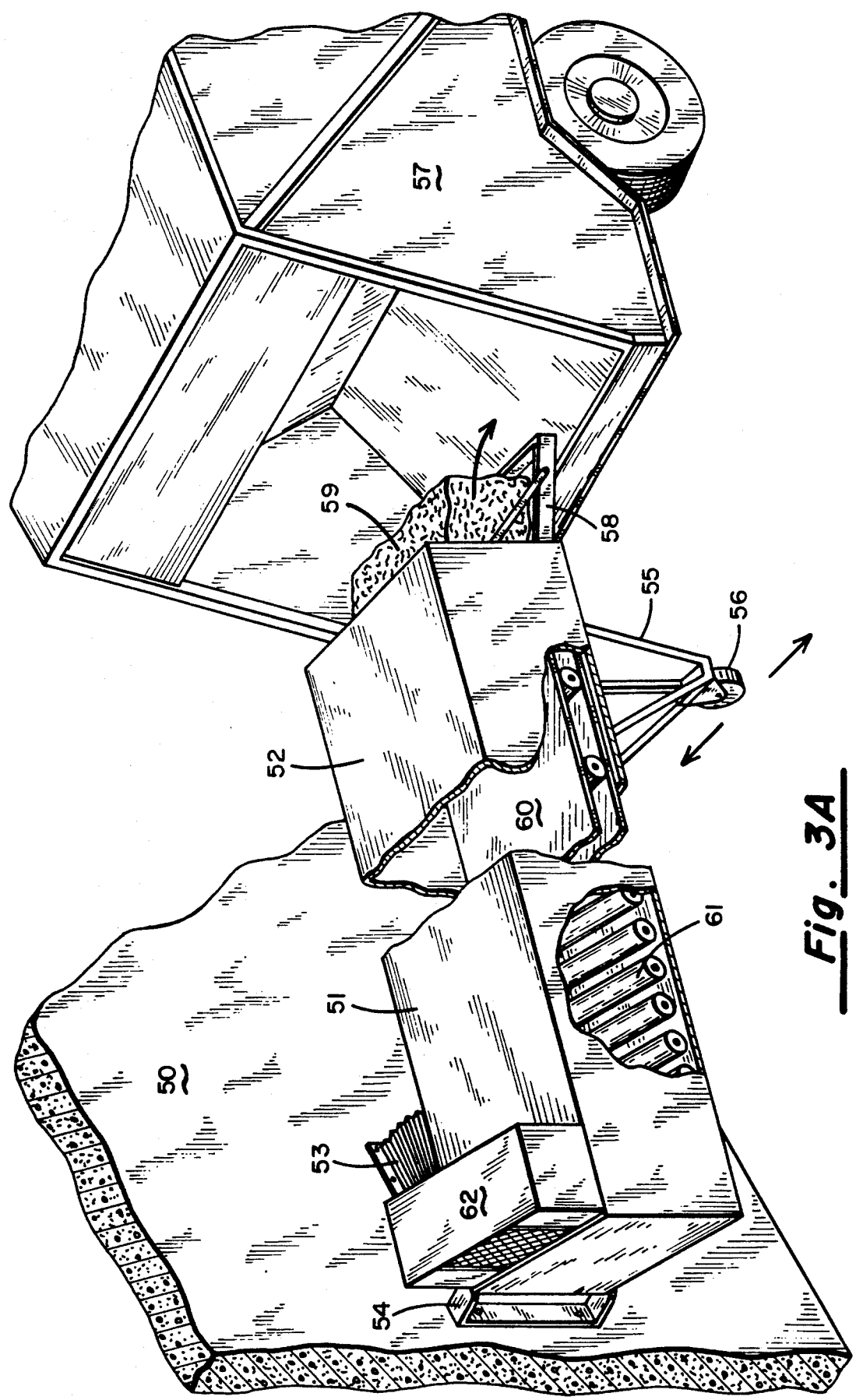
FIG. 3A is a perspective view illustrating additional and fragmentary alternative details of containers in accordance with the invention.

The system container is preferably provided with a space conditioning means which illustrated at 62 in FIG. 3A and which is designed to automatically control the temperature within the container as required to comply with any storage codes which might apply to the system. This would include refrigeration of garbage during the summer months and/or preventing freezing of the system in the winter, if applicable. The use and operation of such a system is generally well-known.

FIG. 3B illustrates a telescoping embodiment in which telescoping modular sections 161, 162 and 163 extend from fragmentary wall section 164. The sections can be extended or retracted as necessary for time variable storage capacity. A completely mechanized carriage wheel system is shown at 165 which can also be used with any of the other embodiments where mechanization and automation of the movement of the storage container is desired. The system includes a motor and drive system represented by 166 which connects to a wheel 167 which is mounted to both pivot and rotate. The system is also made height adjustable as by a driven rotating screw or the like.

Figure 4:
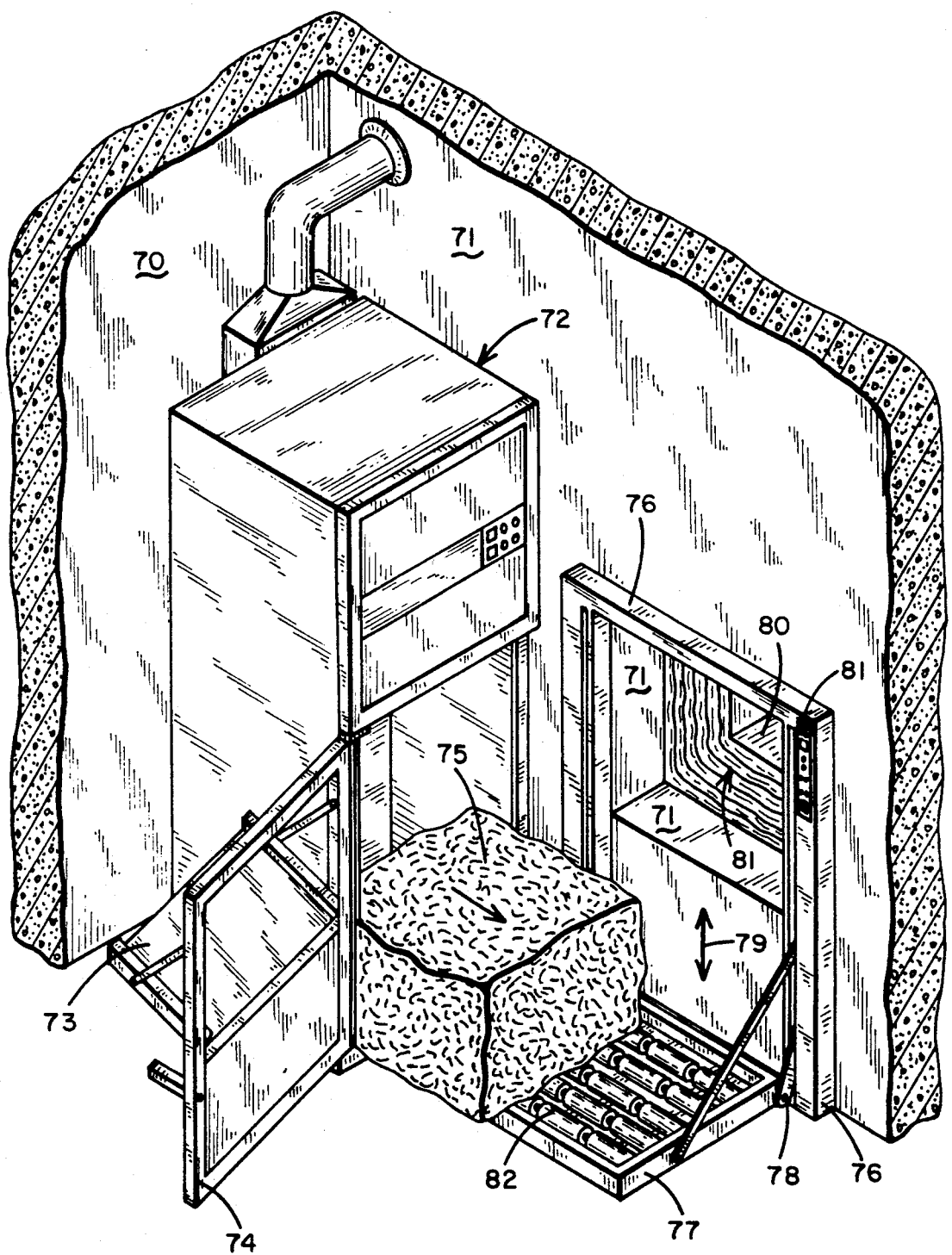
FIG. 4 depicts one mode of transfer loading of trash into the system coordinated with a compactor.

FIG. 4 is a further illustration in perspective of a contemplated mode of charging the system of the invention which is coordinated with a trash compaction device. The figure includes fragmentary wall sections 70 and 71 which meet to form a corner in which a trash compaction device 72 is installed. The compaction device may be one which is commercially available such as a Pollution Packer TM manufactured by the TFC Corporation of Bloomington, Minn. In that system trash is loaded through a vertically pivoting door 73 within in a larger discharge door 74, is compacted by a vertical ram, not shown, usually within a plastic enclosure such as a bag, or using bale straps to form an enclosed parcel or bale of trash as illustrated at 75. The parcel 75 is discharged from the door 74 at a level quite close to the floor.

One loading device in accordance with the present invention includes a door frame 76 having a door 77 mounted from it which pivots about an horizontal axis on hinges at 78 and which mounts on an assembly which, at the same time, is itself vertically adjustable as indicated by the arrow 79 and as will be discussed in greater detail in conjunction with FIGS. 6, 7A and 7B below. The door 77 accesses the interior of the trash storage container of the invention through congruent openings in the building wall 71 and in the storage container 80. Accordion joint 81 accommodates both horizontal and vertical pivoting of the container. The door 77 is further provided with spaced parallel gravity rollers 82 which provide a support and loading platform for the parcel 75. The door 77, when opened, can be adjusted vertically to accommodate the parcel as it is discharged from the compactor 72, support and lift it to a height commensurate with the support and conveying structure desired for the parcel within the container and thereafter can be tilted so that the parcel is conveyed by the rollers 82 into its proper place in the container. The door thereafter closes to seal the inside of the container from the inside of the building.

Hand operated pushbutton control may be provided as illustrated by the panel 81. Access may be limited by a code which must be entered to enable one to operate the door. The door 77, also may be the platform of a scale and weigh the parcel after it is discharged from the compactor 72 so that the weight of eaeh parcel of trash may be recorded and utilized.

Figure 6:
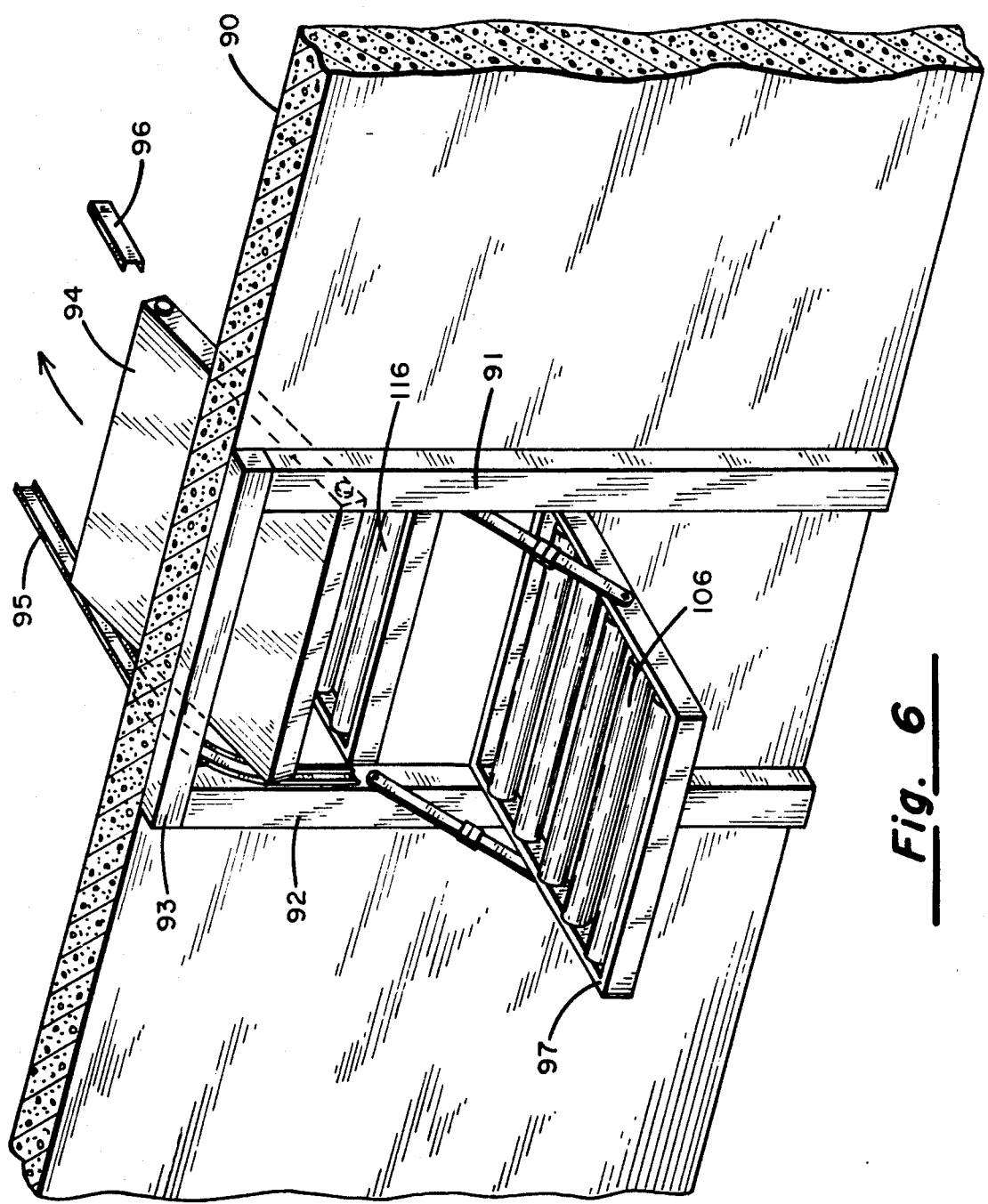
FIG. 6 depicts, in perspective, an alternative loading door embodiment.

FIGS. 6 and 7 further illustrate details of embodiments of the door accessing the container from within the building. FIG. 6 includes fragmentary wall section 90 having an opening therein framed as by a frame having vertical members 91 and 92 and horizontal member 93 depicts a two-component door or closure system for the opening including an overhead door 94 which operates on overhead door track 95 cooperating with a track fragment which is shown at 96. Of course, when closed, door 94 seals the top portion of the opening defined by the frame. The second operable door platform member 97, as is more readily ascertained with reference to FIGS. 7A and 7B, is mounted so as to pivot vertically about horizontal axes as at 98 and 99 through holes as at 100 in attachment ears 101 and 102. The amount of pivotal travel is limited by support members 103 and 104. Sets of internally threaded mounting members including upper members 105 and 106 and lower members 107 and 108 are provide din conjunction with rotating threaded members 109 and 110 which are cooperatively mechanically driven as by belt 111 in conjunction with pulleys 112 and 113 in a well-known manner to rotate members 109 and 110 in unison to raise and lower the pivot point of the door 97 along the members 109 and 110. This allows positive adjustment of the fully open horizontal level of the door 97 such that a parcel of trash supported on rollers 114 can be raised or lowered t accommodate the height of the rollers as at 116 in the container and thereafter transferred directly to rollers 116 or rollers at any other desired height. The operation of the system is also depicted in the illustration of the FIG. 7B.

A container bottom construction in accordance with the present invention is illustrated by the exploded perspective view of FIG. 8. By that illustration it can be seen that a continuous bottom member 140 is provided having side edges 141 and 142 bent upon themselves upward at 90° and thereafter flared at 90° to form further horizontal sections 143 and 144 upon which specially bent sheet metal mounts as at 145 can be mounted to accommodate rollers as illustrated at 146. The bottom structure is sufficiently rigid to eliminate the need for further structural members while, at the same time, creating a box-like structure which prevents leakage of liquid or other materials through the bottom of the container. The double bending of the member 140 not only forms sides which ar leakproof and accommodate the roller mounting members 145 but also imparts the necessary structural strength to the integrity of the system.

FIG. 9 illustrates a device for urging parcels of trash along within a container having unmechanized roller platforms supporting the bales of trash. The system contemplates a threaded rod 120 mounted between supports 121 and 122, support 122 having mounting brackets 123 and 124 and further rotating drive member 125. A pusher member 126 is hingedly mounted to an attachment 127 which, in turn, is adapted to threadedly mount on the rod 120 and move therealong. The pusher member 126 is adapted to pivot in accordance with the arrow 128 such that when the member 126 is propelled in the direction of arrow 129 it will push a parcel in front of it but when the member 126 is retracted it will fold up to ride over any intervening parcels and reposition itself, urged by spring 127a, on the rear side of another parcel so that when the direction of travel is again reversed it will become a pusher once again.

Figure 5:
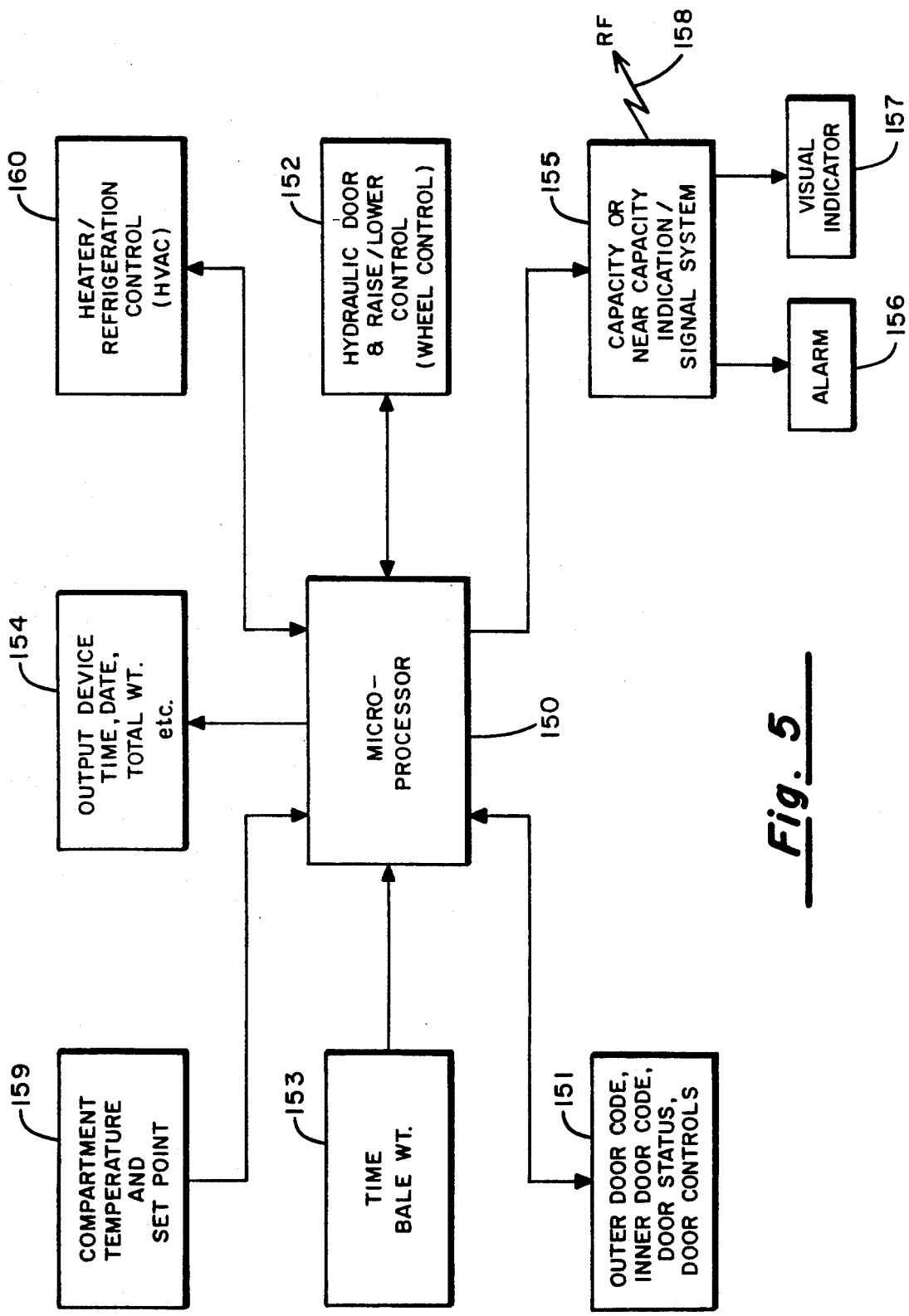
FIG. 5 is schematic diagram of a control system which may be used with the invention.

FIG. 5 illustrates a typical control schematic for use with the through-the-wall trash handling and storage system of the invention. The system might be microprocessor controlled as at 150 and includes door access loading and unloading controls as at 151 which coordinates with door operating controls as at 152 together with controls for operating the pivoting mechanism. Input data for loading the trash is illustrated at 153 and output functions are illustrated at 154, 155, 156 and 157. Thus the date, time, weight, type and any other data required or desired for each parcel loaded into the system are inputed at 153 and may be outputed in any desired way as by 154 which may, for example, include a printer. The load status of the container is indicated at 155 and an alarm or visual indicator may be provided together with a radio frequency (RF) signal which may be transmitted directly to alert a hauler as at 158. Controls for the space conditioning means are illustrated by 159 and 160 in which the required set point is inputed to the microprocessor which initiates the corresponding control for the refrigeration or heating unit as shown at 160. The control system also contemplates being interrogated by a hauler if desired to access the status of the container related to a need for pick up.

Figures 10A, 10B:
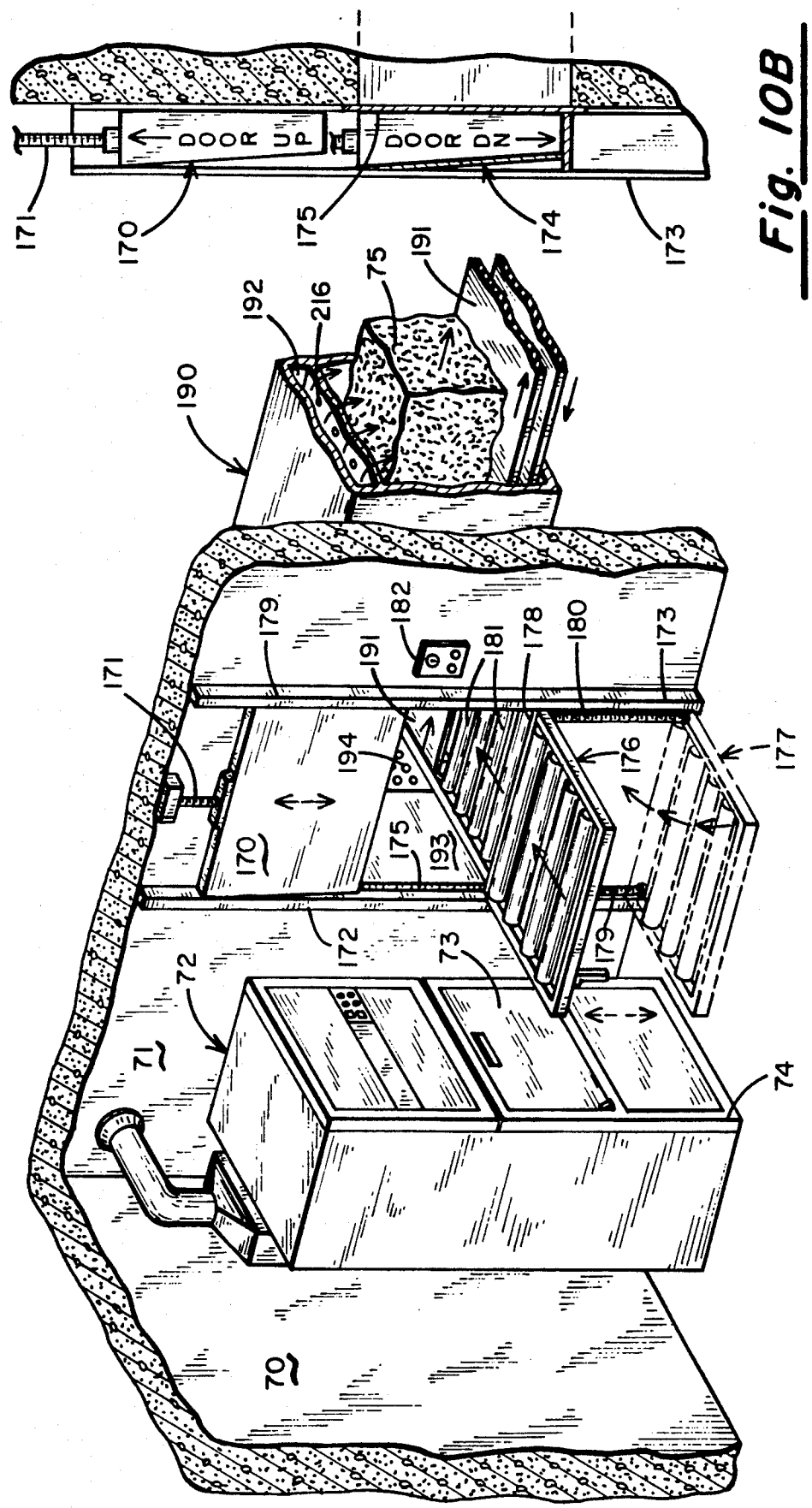
FIG. 10A is a perspective view with parts broken away which depicts an alternative embodiment to that of FIG. 4 of a mode of transfer and loading in conjunction with a trash compactor.
FIG. 10B is a detail of the close operation and seal of FIG. 10A.

FIG. 10A is a perspective illustration showing an accessing and loading, or charging, system in accordance with the invention involving transfer of compacted parcels from a refuse compacting machine similar to that described in relation to FIG. 4. The embodiment of FIG. 10 includes a vertically operating, motorized access door 170 which may be operated by a motorized screw-type device shown in part at 171 and which is vertically contained by structural members 172 and 173. It should further be noted, as depicted in FIG. 10B, that the thickness of the door 176 may be somewhat tapered top to bottom to give the door a wedge shape so that, when fully closed, the members 172 and 173, with side guides as at 174, will hold the door firmly against the seal shown in part at 175.

A powered lift rack 176 is provided which is hinge mounted in a well-known manner and has the ability to pivot vertically between a substantially vertical storage position parallel to the wall 71 to a substantially horizontal supporting and lifting position illustrated in the figure. The lift rack is fully adjustable vertically so that it may be lowered to a position close to the floor, as shown in phantom at 177, to receive cubes, boxes, bales or other parcels or portions of refuse directly from the compactor 72 (as depicted in FIG. 4). The refuse is received onto the supporting structure of the rack 176 which may be a roller conveyor having spaced parallel rollers 178 journalled in a sturdy frame as shown. The powered support rack 176 can then be adjusted vertically, as by a pair of powered screws 179 and 180, to raise the refuse to a point at or just above the level of an internal input or charging roller conveyor depicted by rollers 181 which are aligned in substantially parallel relation to the rollers 178 in the rack 176. While the parcels of refuse can be pushed over the rack and charging conveyor rollers quite easily while being loaded, it is further contemplated that these devices be mechanically driven if desired. Electrical, pushbutton controls for the door 170 and the rack 176 are shown at 184. Access to operate the system may be limited. It may be key operated, code encrypted, or the like.

A broken fragment of the storage container or chute 190 is shown as it emerges from behind the fragmentary wall section 71. It contains a refuse supporting, endless belt conveyor 191 and an overhead space conditioning air distribution plenum, described in greater detail below, is shown in part at 192. Internal panels such as at 193, which may be stainless steel or aluminum, are provided to affect a smooth and aesthetic internal transition through the wall from the inside of the building of interest to the freestanding container 190. Return air openings in an end panel (see FIG. 12) are illustrated at 194.

Figure 11:
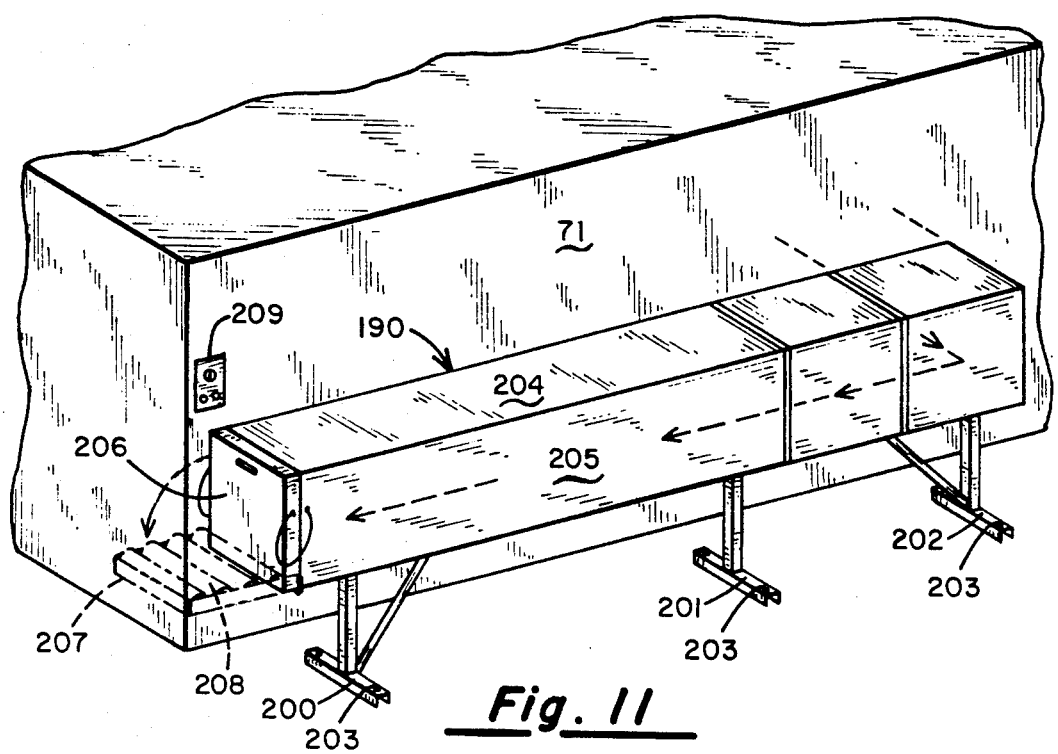
FIG. 11 is a perspective representation of a freestanding alternate embodiment of the storage container of the invention.

In FIG. 11, the container embodiment 190 is shown as a freestanding parallelepiped structure supported on a plurality of sturdy reinforced supports as at 200, 201 and 202. The supports may be permanently attached to a concrete slab or other support surface as by height adjustable leveling members 203 which may be adjusted to level the container 190 as required. A side panel and top panel of the freestanding container 190 are depicted at 204 and 205, respectively. A power driven, limited access discharge door is provided at 206. It may carry a discharge support roller conveyor having rollers such as 208 on its inner surface, as shown in the phantom open deposition at 207, so that portions of refuse discharged from the end of the conveyor 191 in container 190 can be caused to roll over the rollers 208 and into a waiting refuse receptacle such as the receiving reservoir of a rear-loading refuse truck. Access to the door 206 may also be limited as by making it key-operated or encrypted and the door may be electrically mechanized or controlled. One of several optional controls for this is illustrated by the key and pushbutton switches shown at 209.

Figure 12:
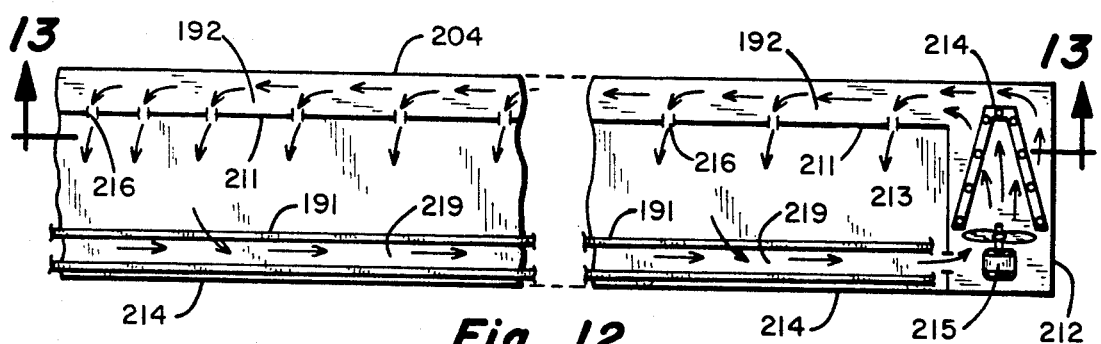
FIGS. 12 and 13 depict fragmentary side and top views of a typical internal space conditioning convection distribution and return plenum arrangement for the storage container of the invention.

FIG. 12 depicts an internal side elevational or partial sectional view of end fragments of the container 190 illustrating the power air convection circulation in the storage volume. The view includes top container panel member 205, associated internal top plenum partition panel member 211, outside end member 212, internal sheet metal end partition panel 213 and bottom panel member 214. A blower 215 and an A-frame heat exchanger 217 are also shown in the figure.

Figure 13:
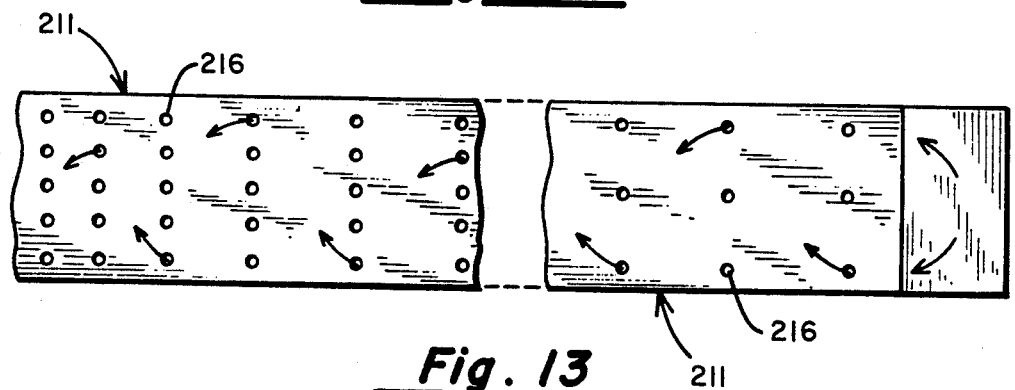

FIG. 13 shows the plenum partition member 211 provided with a pattern of openings or holes 216 which are depicted as being more numerous toward the left or discharge end of the container 190 so that air being circulated through the A-frame heat exchanger 217 by the blower 215 may be equally distributed along the entire length of the container 190 as it passes through the plurality of openings 216. It is understood that the particular number, pattern and size of the openings 216 will depend on the desired convection distribution pattern and may be adjusted accordingly. It is intended, however, that no blockage occur that would prevent substantially uniform exposure of each parcel or portion of refuse to the space conditioning convection. Recirculation is accomplished in part through the series of holes 194 in the lower portion of the member 213 (FIG. 10) and by return circulation around and under the conveyor 191, as illustrated in greater detail in FIGS. 16A and 16B. While the system is illustrated with reference to cooling, heating coils or the like may also be used.

Figure 14:
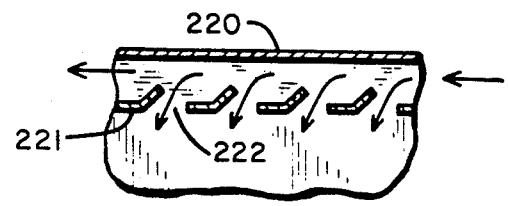
FIGS. 14 and 15 illustrate, in fragmentary views, an alternate distribution plenum arrangement to that of FIGS. 12 and 13.
Figure 15:
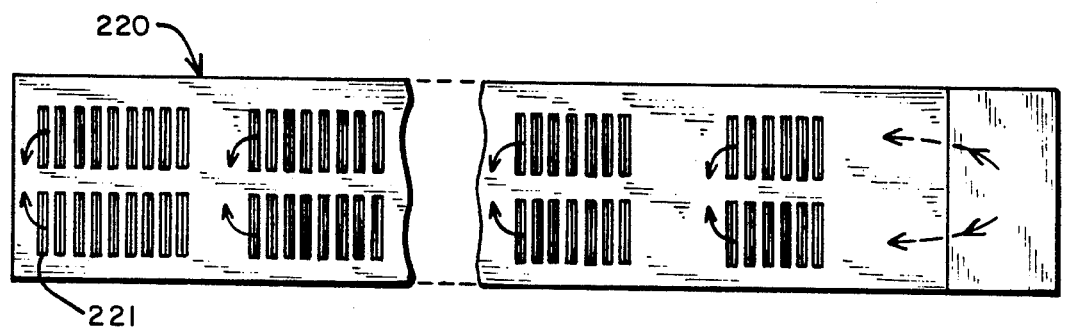

FIGS. 14 and 15 show an alternate convection plenum arrangement in which a series of louver-like members 221 are provided or fashioned from the plenum member 220 and which further define circulation outlets 222. Of course, still other configurations and arrangements which might occur to those skilled in the art are contemplated. The most important consideration of the plenum configuration and circulation system is achieving the desired degree of uniformity within the entire chute or storage volume.

Figure 16A:
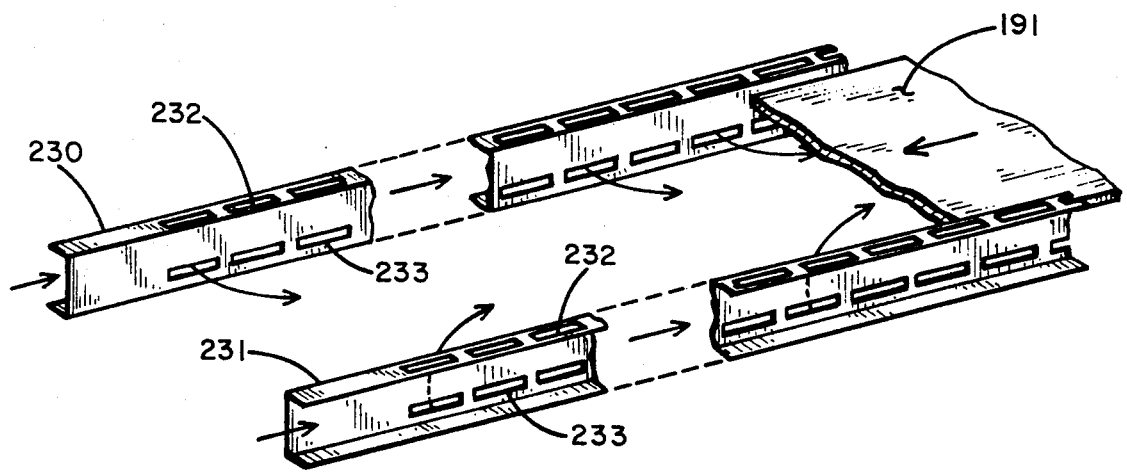
FIG. 16A is a broken fragmentary perspective view of conveyor support side rails, including provision for openings for under-conveyor air return.
Figure 16B:
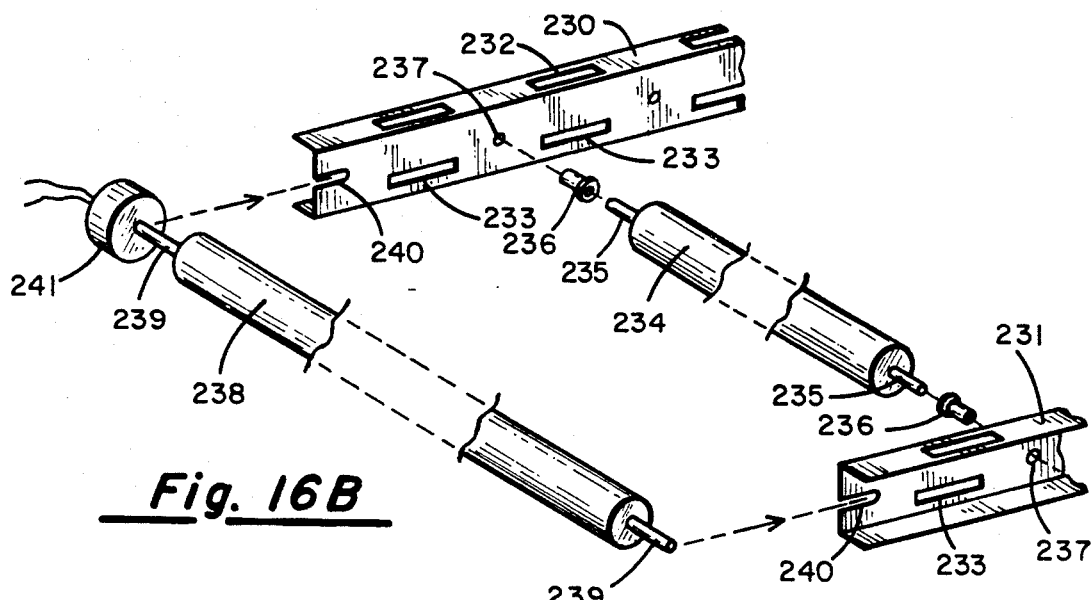
FIG. 16B illustrates an exploded view of a conveyor assembled in accordance with one embodiment of the invention.

FIGS. 16A and 16B depict a knock-down, readily assemblable and readily removable conveyor system for use with the waste container of the invention. The system includes a pair of spaced parallel, oppositely disposed channel members 230 and 231 which are utilized to support an endless conveyor, as at 191, on a series of spaced parallel roller members 234, having axle members 235 suitably journalled in ferrule or bushing members as at 236 which are accommodated in matching openings 237 in the members 230 and 231. The axles and bushing may be of any suitable material such as nylon and the rollers may be of pvc or other plastic conduit material, for example, as desired. When the axles are mounted, the rollers 234 rotate freely as they carry the conveyor 191. A motorized drive pulley 238 is provided, which can be adjustably journalled on spindles 239 in oppositely disposed slots 240, in the members 230 and 231. The motorized pulley 238 is driven by a self-contained motor unit as at 241 and is utilized to power the conveyor 191. Self-contained, motorized conveyor drive pulleys such as that described are available from several manufacturers, including Joki Division of Interroll Corporation of Hauppauge, New York. Alternatively, the conveyor may be constructed entirely of idler rolls as a gravity system in which the parcels or portions of trash are carried by the attitude of the conveyor.

The pair of channel members 230 and 231 are also provided with top openings or wide slot members 232 and side openings or slots 233. These slots are provided to accommodate the return of air circulated through and about the loaded waste by the power convection system, including the plenum chamber 192, and to aid in the uniform distribution of conditioned air throughout the internal loading volume of the container or chute 190. As is the case with the convection plenum outlet openings, the openings in the channel members 230 and 231 are sized and spaced according to the designed recirculation of air and may be more numerous toward the outlet end of the container 190 so as to reduce or eliminate short circuiting of the recirculated air.

With respect to the construction and assembly of the conveyor system itself, it is preferably made so that it can be very readily assembled and taken apart and removed from the container 190 so that the container can, for example, be have its interior entirely washed down from time to time as needed to remove any materials which may have fallen through to the bottom of the container and to generally maintain sanitary conditions therein. In this manner, the channel members 230 and 231 are designed merely to rest on the inner surface of the bottom panel member 214 spaced by the length of the rollers 234 such that when assembled, the bushings 236 are assembled into the openings 237 and the channel members 230 and 231 are spaced apart by the rollers 234 which are of a length such that the channel members, when the conveyor is assembled, are spaced to align adjacent the side wall members of the container 190. The entire conveyor system containing the rollers and the two channels is held together by containment in the chute 190 and is free to be lifted up and pulled out or pushed into the container 190 through the door 206 and is free to be taken apart or reassembled without the need of tools.

One preferred modular construction of the container or chute member 190 itself also involves a knock-down, self-locking construction which is easy to assemble and dismantle. As shown in FIGS. 17A–17D, the chute or container 190 consists of a plurality of fitted interlocking wall members including top member 204, side members 205 and 205a and bottom member 214. The panel members, as shown best in detail 17D, are preferably of a sandwich construction in which inner and outer steel or aluminum cladding members as at 250 and 251, the edges of which may be bent on themselves for added strength, and which contain an amount of insulation material sandwiched therebetween. The insulating material may be any conventional construction foamed insulation of any non-toxic type as at 252 or other suitable material Reinforcement may be by wooden or other structural members where needed such as illustrated at 253. This type of construction yields a strong, lightweight and easily handled panel component.

Figure 17A:
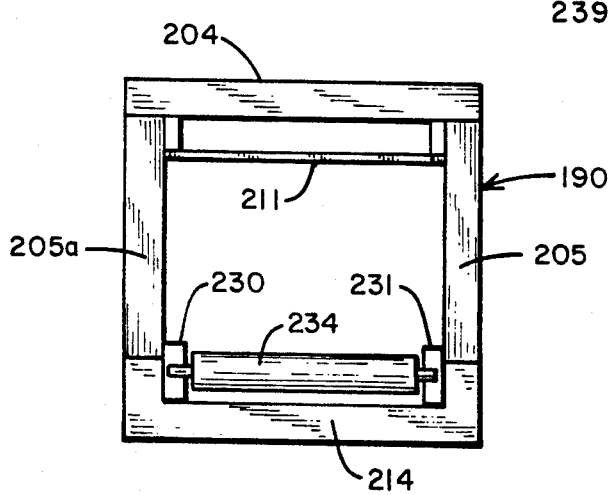
FIGS. 17A-17D depict one construction of the modular storage container or chute of the invention.
Figure 17C:
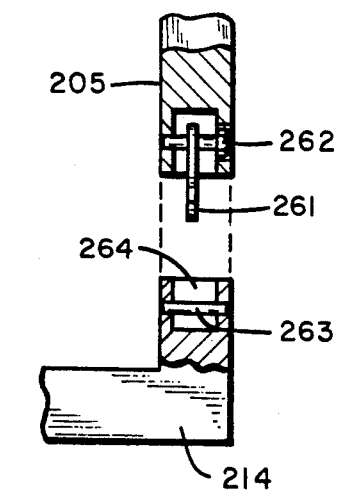
Figure 17B:
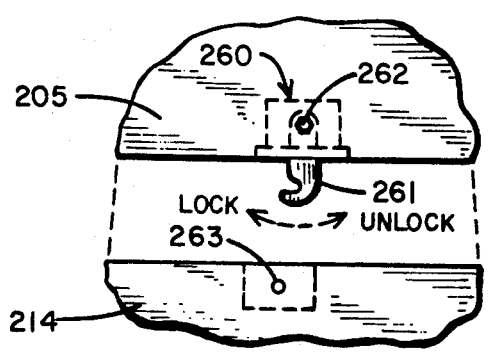
Figure 17D:
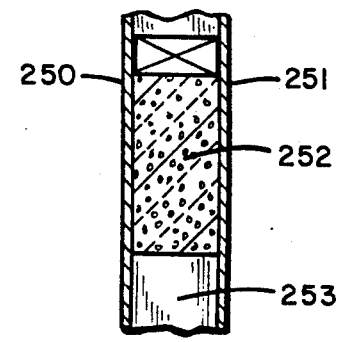

One method of positively fastening the panel members together which is susceptible of easy assembly and disassembly is illustrated in FIGS. 17B and 17C. It involves the use of commercially available, double-cam, rotating locking, devices such as that shown at 260, which include an engageable and disengageable hook member 261 which is operated as by a large Allen wrench using a hex opening as at 262. The cam-operated hook member 261 is located in one member to be assembled and is utilized in conjunction with a rod 263 mounted in the adjacent section opposite the double-cam operated hook member 261. As shown in FIG. 17C, the rod member 263 is mounted in a slot 264 designed to receive the hook member 261 such that when the adjacent panel members as at 205 and 214 are placed in an assembled position, merely rotating the hex opening 262 in a clockwise direction operates the cam lock system 262 causing the hook member 261 to positively and tightly engage the rod 263. A series of these system are used to lock the panels of the assembled container together in a very short time. This provides an easy, readily assemblable system which can be supported as desired and knocked down at will for shipping. Rotation in the counterclockwise direction disengages the hook from the rod for easy dismantling.

It is further desirable that the bottom internal panel 214 including the cladding be slightly U-shaped so that any inadvertent liquid spillage or accumulation will be entirely contained in the container 190. This preserves the integrity of the container with respect to its contents.

The space conditioning means, represented by the blower 215 and A-frame heat exchanger 217, as mentioned above, is meant to represent both a refrigeration system and a heating system combination designed to achieve control at a preset internal temperature for the storage volume of the container or chute 190 regardless of the ambient temperature outside of the container. In this manner, organic refuse or waste material subject to quick spoilage at normal room temperatures can be stored for an extended period without deterioration. According to some refrigeration experts, the ideal temperature at which food matter can be stored to retard spoiling is approximately 37° F., which may be a goal temperature of operating such a system, depending on climate and contents.

It is also contemplated, however, that such a system could also be utilized to store fresh food kept separate from any waste material in a manner which might replace typical walk-in coolers utilized today. It will further be appreciated that the space conditioning means associated with the container 190 may be located at any convenient place and the air circulated through the convection plenum by any well-known means. The system also may be mounted as shown with the cooling heat exchange system located on the container and condenser/compressor system located outside the body of the container 190 in another location, such as from the bottom 208 or on the top as depicted in FIG. 3A.

In operation, with the compactor door having been opened as in FIG. 4, a parcel, bale, cube or portion of refuse compacted in the hydraulic compactor 72 is transferred onto the loading rack 176 in its lowered disposition. The rack is then raised to the level desired to transfer the parcel onto the loading rollers 181 which, in turn, are used to transfer the parcel to the storage and discharge conveyor 191. The conveyor 191 has the capacity to hold a plurality of the parcels and can be advanced as necessary to accommodate newly loaded trash. Of course, refuse parcels or portions can be hand loaded without using the compactor, if desired.

As each new portion or parcel is loaded onto conveyor 191, it may be advanced until the belt is full. The system may be discharged directly into the receiving receptacle of a trash collecting vehicle by simply opening the door 206 and advancing the conveyor 191. Parcels behind them push the others over the rollers 208. Only the last parcel may have to be off loaded by auxiliary or hand pushing. The discharge intervals, of course, can be scheduled to be spaced within a time interval which does not allow the container to quite reach capacity. Any desired or required safety interlock switches necessary to protect the person of the operator or those coming in contact with the mechanism of the system may also be provided in accordance with established practice in a well-known manner.

In controlling the operation of the powered conveyor pulley 238, it is further contemplated that the conveyor could be indexed as each portion of waste material is put on the conveyor such that the conveyor is advanced just enough to accommodate the next portion of waste. This prevents bags or bales of waste from being advanced to the end of the system and thereafter having the conveyor slip underneath the package as it is advanced later on during the accumulation of other material in the container 190.

During the time that the parcels reside in storage within the container, space conditioning is applied as required to maintain the desired storage temperature to inhibit decomposition, odors and other undesirable consequences. The parcels can be held in the storage volume for some time without fear of deterioration. In addition, the storage environment remains intact. It is not open to attract vermin and is not accessible or vulnerable to having undesirable or even hazardous or other waste materials, that by law or regulation may require special handling, inadvertently or intentionally thrown into it, as is the case with the traditional dumpster. The convenience of the system is also labor saving to the establishment, both from the standpoint of saving trips by employees to dispose of refuse and by reducing the required number of trash pickups.

This invention has been described in this application in considerable detail in order to comply with the Patent Statutes and to provide those skilled in the art with the information needed to apply the novel principles and to construct and use such specialized components as are required. However, it is to be further understood that the invention can be carried out by specifically different equipment and devices and that various modifications both as to equipment and procedure details can be accomplished without departing from the scope of the invention itself.

For example, the system may be set up between rooms or partitions totally within a building rather than strictly an indoor/outdoor arrangement. In such a setup, only the discharge end of the container 190, as door 205, might be accessible from outside the building of interest.

What is claimed is:

1. An integrated through-the-wall waste handling and storage system for processing and holding waste pending disposal which utilizes an opening in an inner or outer building wall and is accessible from both sides of the associated building wall comprising:
   an elongated enclosed holding container for receiving, storing and discharging waste, including:
     a receiving end portion having a receiving opening therein for receiving waste, wherein the receiving end portion is adapted to address a wall and to communicate through a juxtaposed wall opening,
     a storage volume section for storing trash prior to collection, and
     a discharge end portion having a discharge opening therein for expelling waste, wherein the discharge opening is accessible from the other side of the wall from a loading means;
   a limited access motorized door associated with and accessing the receiving opening;
   storage volume power driven mechanical conveying means for supporting and moving the waste within the storage volume of the container;
   trash discharging means for discharging the trash through the discharge opening capable of discharging trash directly into a hauling mechanism; and
   limited access motorized door associated with the discharge opening;
   trash loading means including mechanical conveying means for receiving and supporting trash and conveying trash into the receiving end portion of the holding container, wherein the loading means is capable of accessing the holding container receiving opening through the wall opening; and
   control means for controlling the operation of the system.

2. The waste handling system of claim 1 further comprising space conditioning means including refrigeration means having a distribution plenum system for controlled distribution of cooled air for maintaining a desired temperature throughout the container.

3. The waste handling system of clam 1 wherein the container substantially defines a rectangular parallelepiped shape and wherein the receiving opening accessed by the waste loading means is located in one side of the container.

4. The waste handling system of claim 3 wherein the discharge end of the container is fully pivotally movable with respect to the receiving end which is fixed to the building wall.

5. The waste handling system of claim 1 herein the holding container is freestanding and fixed to the wall of the building at the receiving end thereof.

6. The waste handling system of claim 5 wherein the container comprises a plurality of substantially parallelepiped modular sections.

7. The waste handling system of claim 6 wherein each of the modular sections is self-contained and includes powered conveying means and requires only a source of power.

8. The waste handling system of claim 1 wherein the discharge end of the holding container is freely pivotally movable with respect to the receiving end which is fixed to the building wall and further comprising adjustable sealing means for maintaining the integrity between the building wall and the receiving end of the holding container throughout the pivotal travel of the discharge end of the holding container.

9. The waste handling system of claim 8 further comprising means for pivotally adjusting the container means with respect to the building wall.

10. The waste handling system of claim 9 wherein the means for pivotally adjusting the container means with respect to the building wall further comprises a mechanized wheel means supporting the discharge end portion of the container which includes mechanized means for adjusting the elevation of the discharge end portion of the container.

11. The waste handling system of claim 1 wherein the waste loading means for loading the container is selected from a series of spaced parallel rollers and a powered conveyor means.

12. The waste handling system of claim 1 wherein the means for discharging waste is selected from a series of spaced parallel rollers and a powered conveyor means.

13. The waste handling system of claim 1 wherein the container comprises at least one waste support level and wherein the mechanical conveying means for conveying the waste comprises a retractable pusher.

14. The waste handling system of claim 1 wherein the waste discharging means further comprises a generally rectangular hinged door pivoted about a horizontal axis to thereby open away from the discharge opening in the container and further comprising travel limiting means so as to be substantially horizontally disposed when fully opened, the inner surface thereof carrying a discharge conveyor means that forms a platform, such that waste received on the platform can be off loaded into a waste hauling means.

15. The waste handling system of claim 1 wherein the holding container further comprises at least one internal waste supporting platform including a series of spaced parallel rollers.

16. The waste handling system of claim 15 wherein the container contains a plurality of waste holding platforms.

17. The waste handling system of claim 1 wherein the holding container further includes at least one waste holding platform defined by a powered endless conveyor means.

18. The waste handling system of claim 17 wherein the conveyor means has at least one self-powered roller.

19. The waste handling system of claim 17 wherein the container contains a plurality of waste holding platforms.

20. The waste handling system of claim 1 wherein the means limiting access through the closure means of the input and discharge openings comprise automatically controlled doors.

21. The waste handling system of claim 20 wherein the access to operate the doors is key controlled.

22. The waste handling system of claim 1 wherein the loading means for the receiving end of the container further comprises a generally rectangular door hinged to pivot about a bottom horizontal axis to thereby tilt away from the input opening and including a travel limiting means such that the door is substantially horizontally disposed when fully opened, the inner surface thereof forming a loading platform, the door hinge height itself being further vertically adjustable such that waste parcels may be received on the loading platform of the door at any desired height and transferred to the receiving end of the container through the input opening at any desired height.

23. The waste handling system of claim 22 further including proximate compacting means for compacting parcels of waste for transfer onto the inner surface platform of the door for loading into the container.

24. The waste handling system of claim 22 wherein the limited access to the input opening includes an encrypted or keyed lock system.

25. The waste handling system of claim 22 wherein the door further comprises means for weighing the waste when received.

26. The waste handling system of claim 25 including means for totalling the weight in the container.

27. The waste handling system of claim 26 further comprising output means associated with the control means communicating the fact that the storage container is at or near capacity.

28. The waste handling system of claim 1 further comprising output means associated with the control means communicating that the storage container is at or near capacity.

29. An integrated through-the-wall waste handling and storage system for processing and holding organic and inorganic waste pending disposal which is accessible from both sides of an associated wall of a building of interest comprising:
   an elongated enclosed holding container for receiving, storing and discharging waste, including;
      a receiving end section having an input opening for receiving waste from a first side of the wall and adapted to address the building wall such that the input opening communicates through a juxtaposed opening in the wall of interest,
      a storage volume section for holding waste, and
      a discharge end section having a discharge opening for expelling waste and being accessible from the second side of the wall;
   motorized limited access loading and discharge closure means, respectively associated with the input and discharge openings;
   waste loading means for loading waste into the input opening of the holding container through the wall opening;
   motorized main conveying means for supporting and moving the waste within the storage volume section of the container;
   space conditioning means including refrigeration means for maintaining a desired temperature in the storage volume;
   waste discharging means for off loading waste through the discharge closure means; and
   control means for controlling the closure means and the conveying means.

30. The waste handling system of claim 29 wherein the waste loading means further comprises a powered lift rack.

31. The waste handling system of claim 30 wherein the lift rack is adapted to address the discharge outlet of a proximate waste compactor and the receiving portion of the holding container.

32. The waste handling system of claim 29 wherein the loading closure means is a vertically operating door.

33. The waste handling system of claim 32 wherein the vertically operating door is self-sealing.

34. The waste handling system of claim 29 wherein the limited access is key operated.

35. The waste handling system of claim 29 wherein the space conditioning means includes convection means providing relatively uniform convection circulation in the holding container.

36. The waste handling system of claim 35 wherein the convection means further comprises distribution plenum means having openings therein for providing relatively uniform distribution of air throughout the storage volume of the loading container and blower means for circulating the air.

37. The waste handling system of claim 36 wherein the openings are a series of spaced holes.

38. The waste handling system of claim 36 wherein the openings are a series of spaced louvers.

39. The waste handling system of claim 36 wherein the convection circulation system further includes return air opening means along the length of the holding container.

40. The waste handling system of claim 39 further comprising a series of spaced distribution plenum openings at the top of the holding container and spaced return air openings located toward the bottom.

41. The waste handling system of claim 29 wherein the waste discharging means further comprises a generally rectangular hinged door pivoted about a horizontal axis to thereby tilt away from the discharge opening and having tilt limiting means so that the door is substantially horizontally disposed when fully opened, the inner surface thereof carrying a discharge conveyor means forming a conveyor platform, such that waste may traverse the inner surface platform and be off loaded directly into a waste hauling means.

42. The waste handling system of claim 29 wherein the waste loading conveyor means comprises a series of spaced parallel rollers.

43. The waste handling system of claim 29 wherein the main conveying means comprises a series of unpowered spaced parallel rollers.

44. The waste handling system of claim 29 further including proximate compacting means for compacting parcels of waste for transfer into the container.

45. The waste handling system of claim 29 wherein the main conveying means is an endless belt conveyor having a forward located, self-powered drive roller.

46. The waste handling system of claim 45 wherein the conveyor is removable.

47. The waste handling system of claim 29 wherein the conveyor is removable.

48. The waste handling system of claim 47 wherein the main conveying means comprises a plurality of spaced parallel rollers spanning and spacing a pair of parallel side support members held together by containment between the walls of the storage container.

* * * * *

UNITED STATES PATENT AND TRADEMARK OFFICE
CERTIFICATE OF CORRECTION

| | |
|---|---|
| PATENT NO. : | 5 148 739 |
| DATED : | September 22, 1992 |
| INVENTOR(S) : | Anthony Fox |

It is certified that error appears in the above-identified patent and that said Letters Patent is hereby corrected as shown below:

In column 14, line 3, delete "clam" and insert -- claim -- .

In column 14, line 12, delete "herein" and insert -- wherein -- .

Signed and Sealed this

Fourteenth Day of September, 1993

Attest:

BRUCE LEHMAN

Attesting Officer          Commissioner of Patents and Trademarks